United States Patent
Gruett et al.

(10) Patent No.: US 7,488,424 B2
(45) Date of Patent: Feb. 10, 2009

(54) METHOD FOR FLUID TREATMENT HAVING MULTIPLE CYCLES

(75) Inventors: Guy Gruett, Neenah, WI (US); Kurt Gruett, Combined Locks, WI (US); Glenn Gruett, New London, WI (US)

(73) Assignee: Water-Right, Inc., Appleton, WI (US)

( * ) Notice: Subject to any disclaimer, the term of this patent is extended or adjusted under 35 U.S.C. 154(b) by 0 days.

(21) Appl. No.: 11/709,044

(22) Filed: Feb. 21, 2007

(65) Prior Publication Data

US 2007/0262024 A1    Nov. 15, 2007

Related U.S. Application Data

(60) Provisional application No. 60/775,250, filed on Feb. 21, 2006.

(51) Int. Cl.
    *C02F 3/00* (2006.01)
(52) U.S. Cl. .................. 210/670; 210/676; 210/687
(58) Field of Classification Search .............. 210/670, 210/675–676, 687
    See application file for complete search history.

(56) References Cited

U.S. PATENT DOCUMENTS

| 5,628,899 | A * | 5/1997 | Vaughan ............... 210/142 |
| 6,726,817 | B1 | 4/2004 | Gruett |
| 6,736,966 | B2 | 5/2004 | Herrington et al. |
| 6,827,847 | B1 | 12/2004 | Chauvier |
| 6,916,427 | B2 | 7/2005 | Roth |
| 6,929,748 | B2 | 8/2005 | Avijit et al. |
| 6,960,301 | B2 | 11/2005 | Bradley |
| 2003/0205535 | A1 | 11/2003 | Roth |
| 2005/0087484 | A1 | 4/2005 | Lambie |

* cited by examiner

*Primary Examiner*—Chester T Barry
(74) *Attorney, Agent, or Firm*—Ryan Kromholz & Manion, S.C.

(57) ABSTRACT

A method for fluid treatment that provides alternative regeneration cycles within the same fluid treatment device. A second alternative regeneration cycle is available within the same device, which has independent cycles or processes from the first regeneration cycle. The first and second regeneration cycles can be programmed at the same time and be programmed to alternatively run based upon the number of individual cycles run, the time the cycles have run, the amount of fluid that has passed through the device, or the concentration of brine and/or chlorine in the fluid within the device.

10 Claims, 20 Drawing Sheets

From Fig. 14A

↓

CONFIGURATION 5
Select dEL or on0 for the differential pressure switch to trigger a time scheduled or an immediate regen. Selecting Hold inhibits the start of an immediate regen as long as there is switch closure. Hold delays scheduled regens until the next scheduled regen time. ALARM sounds a buzzer on switch closure and displays Service Requried Leak screen.
Default = on0

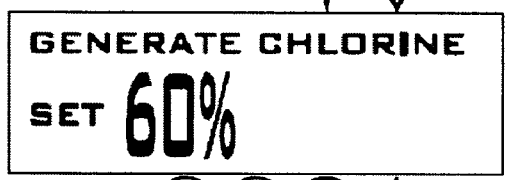

CONFIGURATION 6
Controls percentage of chlorine generator power. Adjustable from 5% - 100% in 5% increments or OFF.
Default=60%

CONFIGURATION, Relay 1
Set relay 1 on trigger to be time, gallons or OFF.
Time: The relay closes a set time after the start of regen, excluding pre-fill.
Gallons: relay closes every set number of gallons while in service
Regen & Gallons: relay closes every set number of gallons while in service or regen
If OFF is selected, the next two screens do not appear
Default = OFF

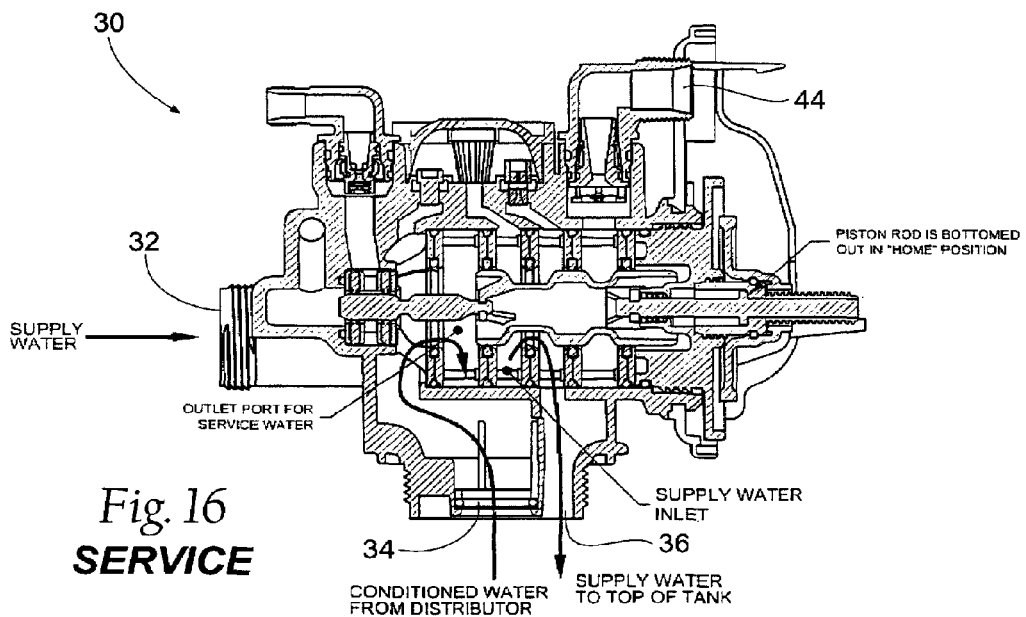
Fig. 16 SERVICE
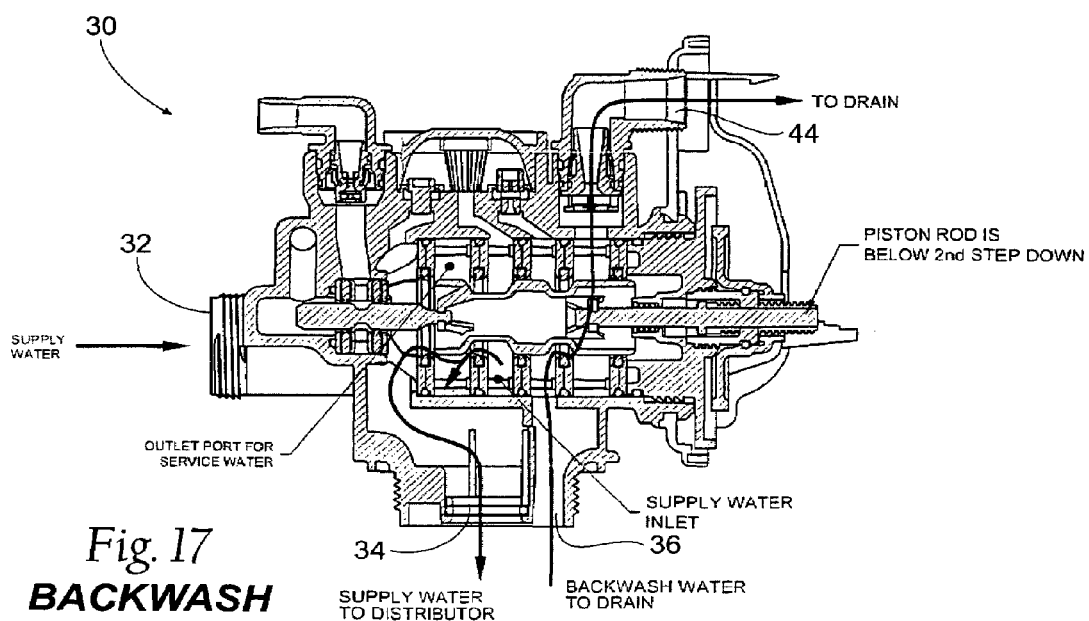
Fig. 17 BACKWASH

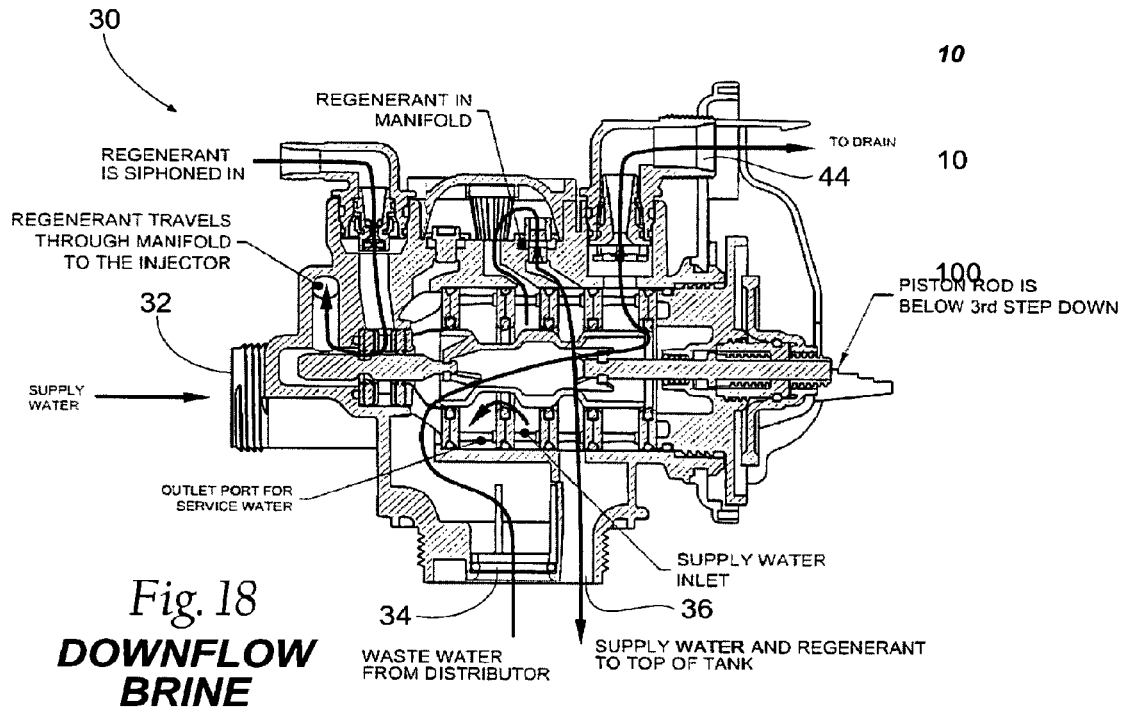
Fig. 18 DOWNFLOW BRINE
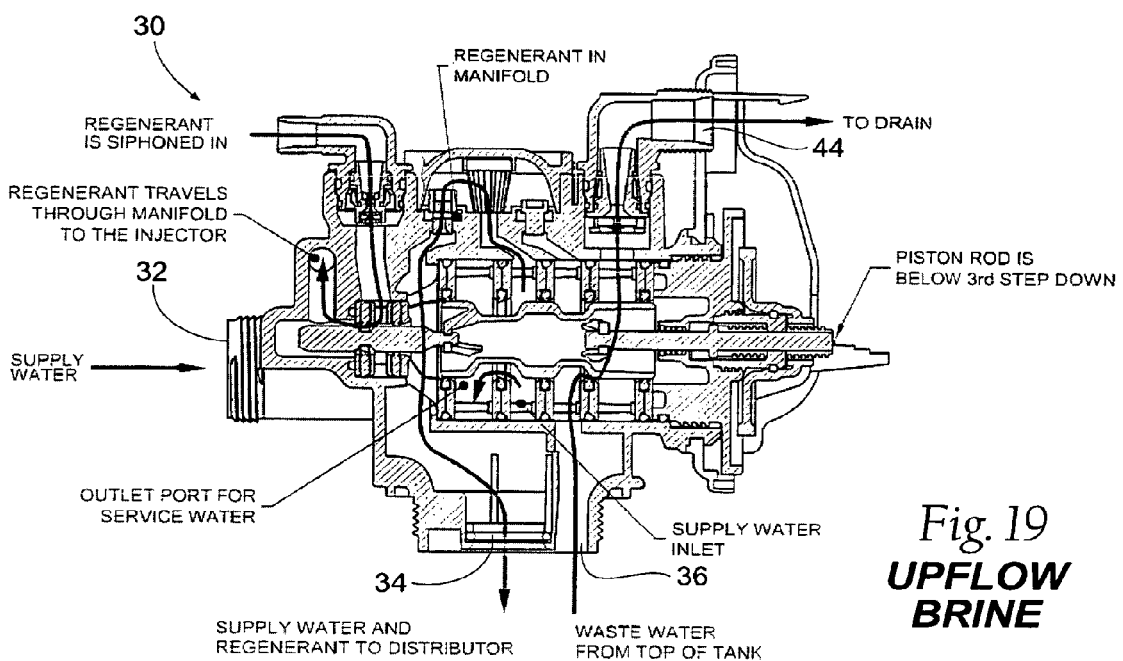
Fig. 19 UPFLOW BRINE

RINSE

FILL

METHOD FOR FLUID TREATMENT HAVING MULTIPLE CYCLES

RELATED APPLICATIONS

This application claims the benefit of provisional patent application Ser. No. 60/775,250, filed 21 Feb. 2006.

BACKGROUND OF THE INVENTION

The present invention relates to methods for fluid treatment that use ion exchange processes to treat the fluids. In particular, the present invention relates to methods and systems that may provide alternate and independent exchange processes within the same system. Fluid filtering and fluid softening processes are becoming more and more common processes and are used in all different situations and environments, from industrial and municipal installations, to individual water filtration systems for homes and houses.

Many of these fluid treatment processes are ion exchange processes that regenerate ion exchange media and media beds used during the fluid treatment. Regeneration fluids are passed through the bed of depleted ion exchange media during which ions are exchanged between the regeneration media and the depleted media. As used herein, the terms "ion exchange media" and/or "media" are defined broadly to include, as examples, resins, and zeolites, natural and synthetic types of both, carbon and activated carbon, activated alumina, and any other amorphous or microcrystalline structures commonly used in exchange processes. Regenerates for the ion exchange media also cover a broad spectrum of compounds, including potassium permanganate, potassium chloride, hydrogen peroxide, sodium chloride, or any other chemical or compound used to recharge, reactivate, oxidize, or rejuvenated a material bed. A common ion exchange media includes high capacity ion exchange resin.

Current processes and systems for residential use allow for basic programming of a regeneration cycle to be undertaken during an ion exchange process. Generally, an ion regeneration cycle will include one or more steps of filling/dissolving of a water treatment device, backwashing the ion exchange media, regenerating the media, rinsing the media, and servicing the media. Current systems and devices allow for individual cycles to be programmed into the system or device. However, there are no known devices in the prior art that allow for alternate regeneration cycles to be programmed and operated within a water treatment system, and especially within a residential treatment system. For example, after a certain number of softening cycles, it may be desirous to have a filtration cycle within the system, without having to shut down or manually reconfigure the system. That is, it would be beneficial to provide an overall treatment system that could have individually programmed treatment cycles, wherein the individual treatment cycles may be programmed at the same time. Further, different activation parameters may be incorporated into the same system, thereby providing warning features for the system if the chemical makeup of the fluid within the system is outside of certain predetermined boundaries. Such a system, especially for a residential application, would be an advantage over the prior art.

SUMMARY OF THE INVENTION

The present invention provides systems and methods for fluid treatment systems, and specifically residential water treatment systems, that allow multiple and alternative regeneration cycles within the same fluid treatment device. Thus, a second regeneration cycle is available within the same system, which has independent steps from the first regeneration cycle. Additional regeneration cycles are available as well.

For example, a first regeneration cycle can be programmed to have a backwash stage, a rinse stage, a backwash stage, and a rinse stage. After the first regeneration cycle runs a predetermined number of times, a second regeneration cycle having, as an example, a fill stage, a softening stage, an UP brine stage, a backwash stage, and a rinse stage, may then be carried out. This pattern of a first regeneration cycle for a predetermined number of cycles followed by a second regeneration cycle may then be repeated.

The second regeneration cycle can be activated in a various number of ways. For instance, the second cycle could be programmed to run after the first cycle has run a predetermined number of times. The second regeneration may also be programmed to be activated by other variables, such as a predetermined amount of time the system has operated since the previous alternate cycle, or the fluid volume that has flowed through the system. Each of the individual regeneration cycles may be programmed to function for a specified or predetermined duration.

The second or alternate regeneration cycle further may be triggered in a variety of ways. For instance, the second cycle may be triggered after a specified period of time, after a specified fluid volume has run through the treatment system, or the number of regeneration cycles run according to the first cycle parameter. In addition, variables, such as the amount of chlorine remaining within the system, may also activate the second cycle. The specific details of the systems and methods will become clearer through the following drawings and description.

The invention may also incorporate warnings and overrides for the systems and methods if any of the above parameters have met predetermined levels. Such warnings also could initiate specific regeneration cycles.

BRIEF DESCRIPTION OF THE DRAWINGS

FIGS. 16-21 provide various exemplary flow patterns through a valve body used in connection with the present invention.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

The present invention provides systems and methods comprising alternate regeneration cycling operations for treating and monitoring fluids in a fluid treatment apparatus, such as a residential water treatment system. The invention allows for system maintenance routines and other similar processes to be incorporated in a single fluid treatment apparatus and method. For instance, the present invention allows a water softening system that runs on a timed regeneration cycle to be programmed for a separate regeneration filtering cycle. The second cycle could be activated after a predetermined number of softening cycles have run, a predetermined number of days have passed, or after a predetermined volume of fluid has run through the system. When referring to the specific operations of the present invention, each of the individual operations, such as backwash, brine tank fill, and softening, will be referred to as a cycle or stage, with the overall cycles being referred to as regeneration cycles. The use of such language is used for clarification purposes and should not limit the scope of the invention in any manner.

Each of the individual cycles and the overall regeneration cycles is programmed to last or run for a specified duration. Duration is defined as any variable to measure a length or magnitude, such as a volume (gallon, liter), time (hour, day, week) number of cycles (10 cycles, 3 cycles), strength of chemical solution (parts per million or chemical strength) or other variable to measure the fluid passing through the system.

Figure 1A:
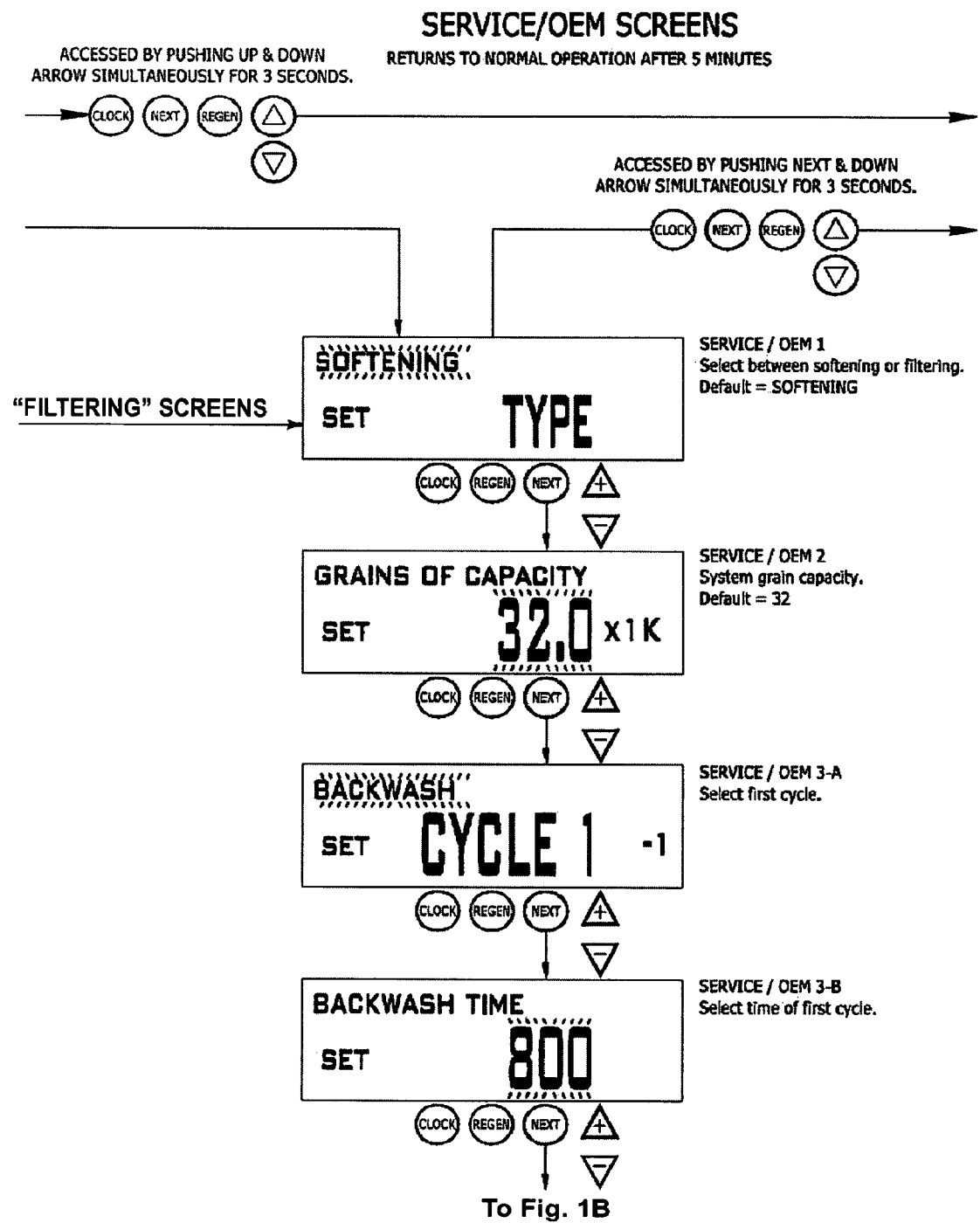
FIGS. 1A and FIG. 1B provide a flow chart for the setup of a cycling regeneration system according to the present invention.
Figure 1B:
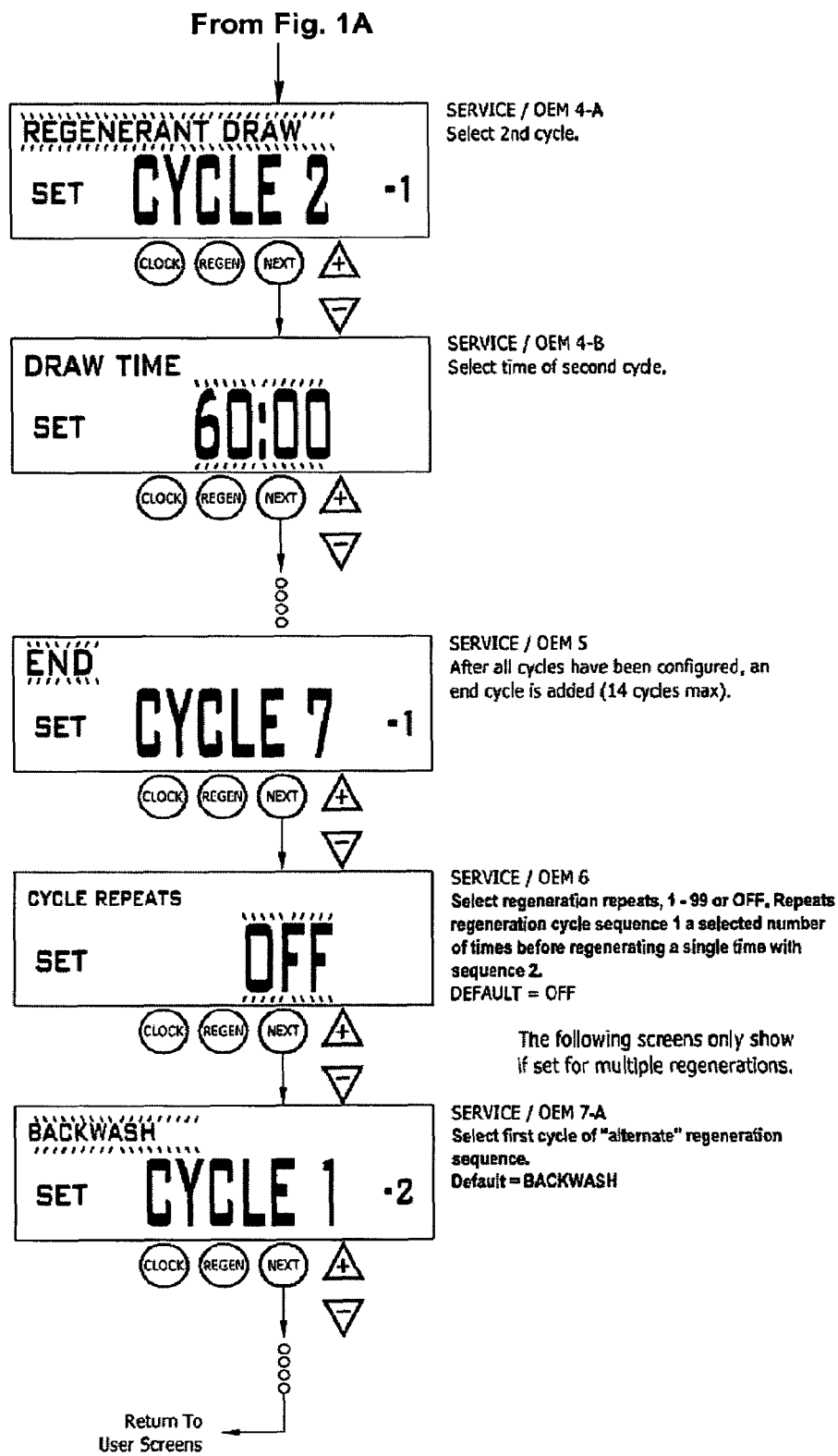

FIGS. 1A and 1B show a general flowsheet for a typical program setup for a first regeneration cycle. On a typical fluid treatment system that incorporates the present invention, an operator will be able to program the separate regeneration cycles. The operator first selects what type of regeneration cycle the first regeneration cycle should be, choosing from either softening or filtering. That is, the regeneration cycle is programmed to determine which individual cycles or stages will make up the regeneration cycle. The operator then enters in the physical capacity of the system. Once established, the operator will set the operating parameters for each of the cycles used in the first regeneration cycle, with the duration of operation of each cycle also being entered.

Once all of the individual cycles are set for the first regeneration cycle, the operator then enters the duration for the first regeneration cycle (see "cycle repeats, FIG. 1B). For example, the operator could enter in how many times the first regeneration cycle will run. Preferably, the first cycle can be repeated between 1 and 99 times, but it is understood that the cycle could be repeated more times if necessary. Likewise, the repeat variable could be changed so that the first cycle will run for a specific period of time, or possible after a specific volume of fluid has passed through the system. The operator will then program the individual cycles for the second regeneration cycle in the same fashion as was done with the first regeneration cycle. The number of repetitions for the second regeneration cycle will be programmed as well.

As with the first cycle, it is possible to program the second cycle for any number of runs, or to program the second cycle based upon another variable, as described above. Further, the first and second cycles do not need to be programmed using the same duration variables. As an example, the first cycle could be programmed to operate for 30 days, and then the second cycle could be programmed to operate for the next 100 gallons of fluid that pass through the system.

Tables 3 and 4 show possible exemplary regeneration cycles and the individual cycles used for the regeneration cycles. Table 5 also shows some examples of standard time and capacity amounts for individual cycles. So, for example, the download regenerant prefill softening cycle of Table 3 could be programmed into the system, and be set to run for 6 consecutive cycles. Then, the filtering cycle of table 4 having no regenerant could be programmed to run for one cycle. The pattern of 6 regeneration cycles for softening, 1 regeneration cycle for filtering would then be repeated. While these values are based on generally known desirous treatment levels for water treatment systems, it is understood that such values could be varied and still fall within the scope of the present invention.

The number of specific cycles could be altered for either of the softening or filtering cycles. For instance, 25 softening cycles may be run, followed by 2 filtering cycles. The cycles may be determinative by volume; the first cycle may run for 500 gallons of fluid passing through the system, whereby the second cycle would run for one, two, or any determined number of cycles. Similarly, the second cycle may run after a time period (e.g., 1 week) or an amount of brine remaining in the system (e.g., less than 25%). The system is capable of using any of these variables as a triggering function to commence the second or an alternate regeneration cycle.

TABLE 3

Regeneration Cycles Softening

| WS1CC & WS1.25CC Downflow Regenerant Refill After Rinse | WS1CC & WS1.25CC Downflow Regenerant Prefill | WS1CC only Upflow Regenerant Refill After Rinse | WS1CC only Upflow Regenerant Prefill |
|---|---|---|---|
| $1^{st}$ Cycle: Backwash | $1^{st}$ Cycle: Fill | $1^{st}$ Cycle: UP Brine | $1^{st}$ Cycle: Fill |
| $2^{nd}$ Cycle: dn Brine | $2^{nd}$ Cycle: Softening | $2^{nd}$ Cycle: Backwash | $2^{nd}$ Cycle: Softening |
| $3^{rd}$ Cycle: Backwash | $3^{rd}$ Cycle: Backwash | $3^{rd}$ Cycle: Rinse | $3^{rd}$ Cycle: UP Brine |
| $4^{th}$ Cycle: Rinse | $4^{th}$ Cycle: dn Brine | $4^{th}$ Cycle: Fill | $4^{th}$ Cycle: Backwash |
| $5^{th}$ Cycle: Fill | $5^{th}$ Cycle: Backwash | $5^{th}$ Cycle: End | $5^{th}$ Cycle: Rinse |
| $6^{th}$ Cycle: End | $6^{th}$ Cycle: Rinse | | $6^{th}$ Cycle: End |
| | $7^{th}$ Cycle: End | | |

TABLE 4

Regeneration Cycles Filtering

| WS1CC & WS1.25CC Downflow Regenerant Refill After Rinse | WS1CC & WS1.25CC Downflow Regenerant Prefill | WS1CC & WS1.25CC No Regenerant |
|---|---|---|
| $1^{st}$ Cycle: Backwash | $1^{st}$ Cycle: Fill | $1^{st}$ Cycle: Backwash |
| $2^{nd}$ Cycle: dn Brine | $2^{nd}$ Cycle: Filtering | $2^{nd}$ Cycle: Rinse |
| $3^{rd}$ Cycle: Backwash | $3^{rd}$ Cycle: Backwash | $3^{rd}$ Cycle: Backwash |
| $4^{th}$ Cycle: Rinse | $4^{th}$ Cycle: dn Brine | $4^{th}$ Cycle: Rinse |
| $5^{th}$ Cycle: Fill | $5^{th}$ Cycle: Backwash | $5^{th}$ Cycle: End |
| $6^{th}$ Cycle: End | $6^{th}$ Cycle: Rinse | |
| | $7^{th}$ Cycle: End | |

TABLE 5

Typical Cycle

| Cycle Options | Units | Range | Increment | Softener Default | Filter Default |
|---|---|---|---|---|---|
| BACKWASH | Minutes | 1-30 | 1 | 12 minutes | 15 minutes |
| | | 30-120 | 2 | | |
| RINSE | Minutes | 1-30 | 1 | 4 minutes | 6 minutes |
| | | 30-120 | 2 | | |
| DRAW | Minutes | 1-80 | 1 | 90 Minutes | 60 Minutes |
| | | 80-180 | 2 | | |
| FILL/ SOFTENER | Lbs. | .1-12.0 | .1 | 10 Lbs. | — |
| | | 12.0-48.0 | .5 | | |
| | | 48.0-200.0 | 2.0 | | |
| FILL/ FILTER | Gallons | .01-1.20 | .01 | — | .95 Gallons |
| | | 1.20-4.80 | .05 | | |
| | | 4.80-20.00 | .20 | | |
| SERVICE | Minutes | 1-120 | 1 | 240 Minutes | 240 Minutes |
| | | 120-480 | 5 | | |

Figure 2:
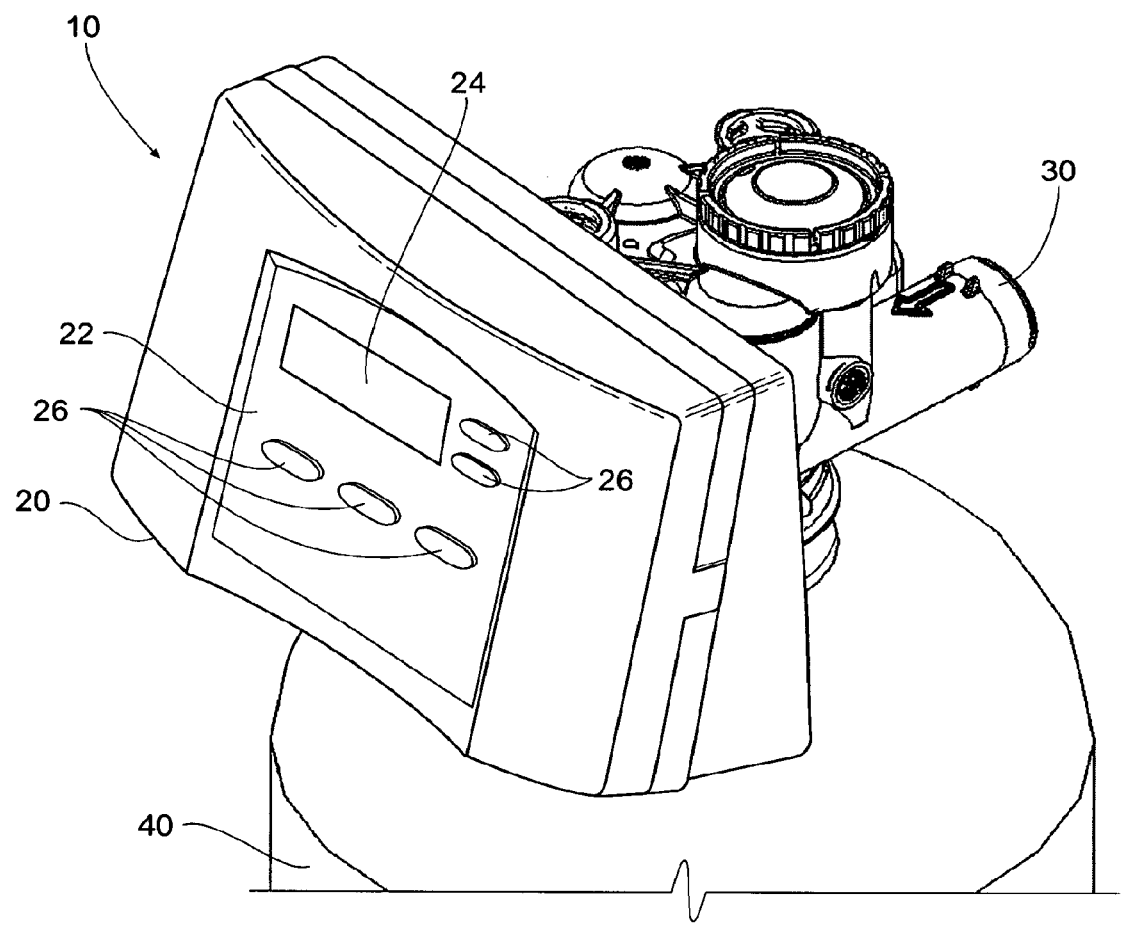
FIG. 2 shows a front perspective view of an apparatus that incorporates the present invention.
Figure 3:
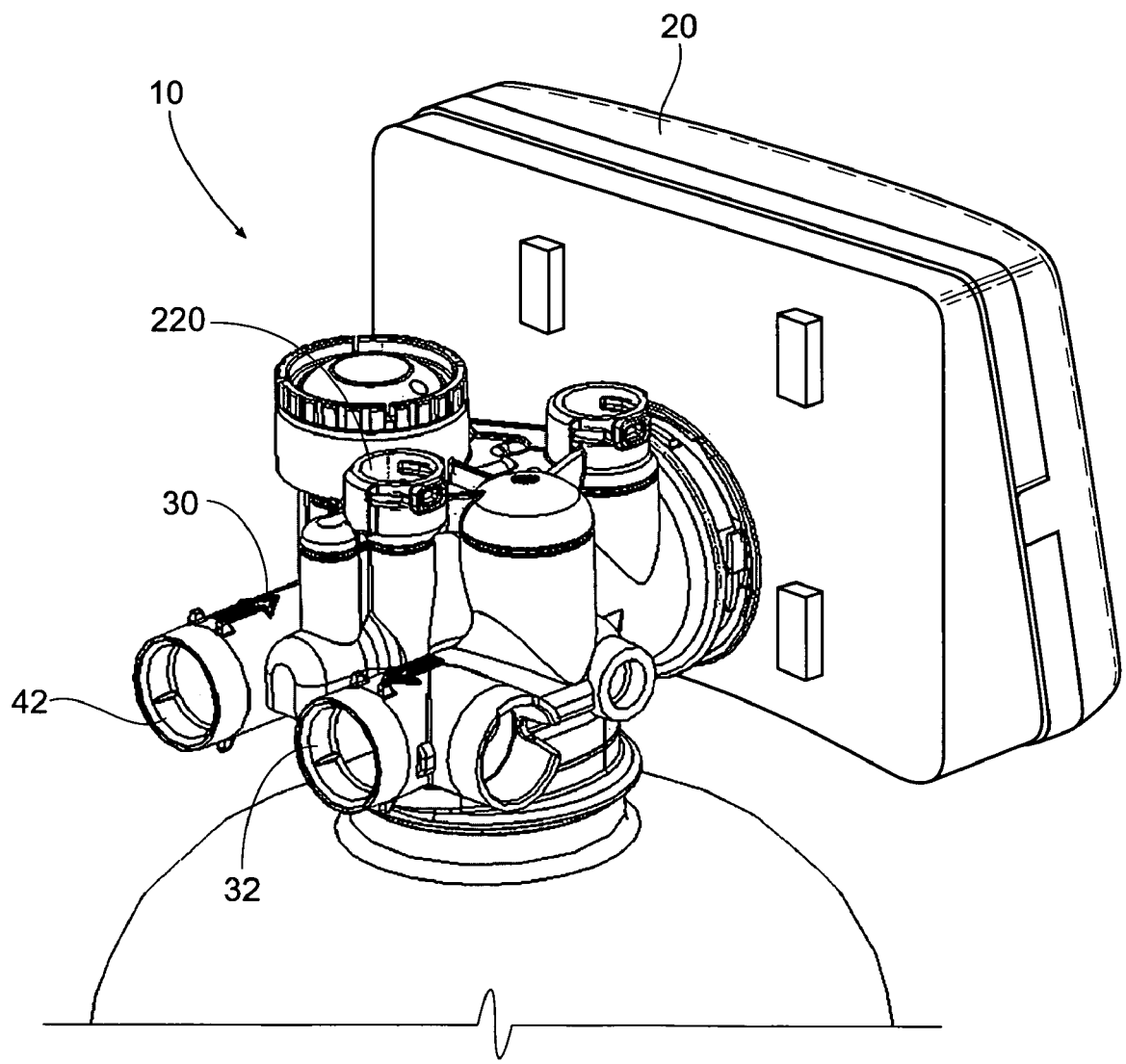
FIG. 3 shows a rear perspective view of the apparatus of FIG. 2.
Figure 4:
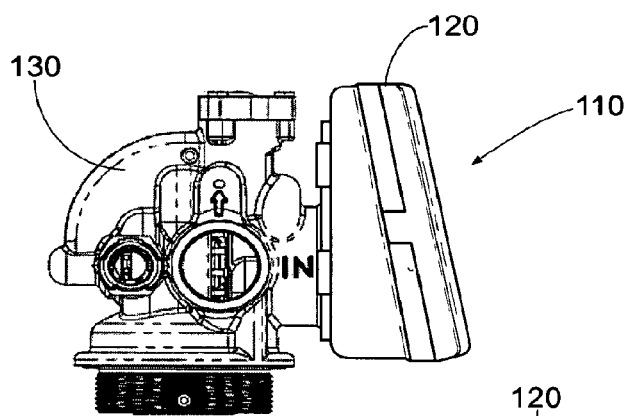
FIGS. 4-7 show a second apparatus that incorporates the present invention.
Figure 5:
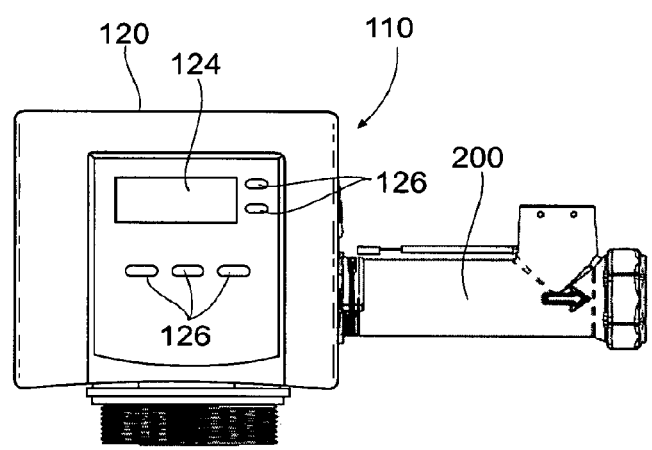
Figure 6:
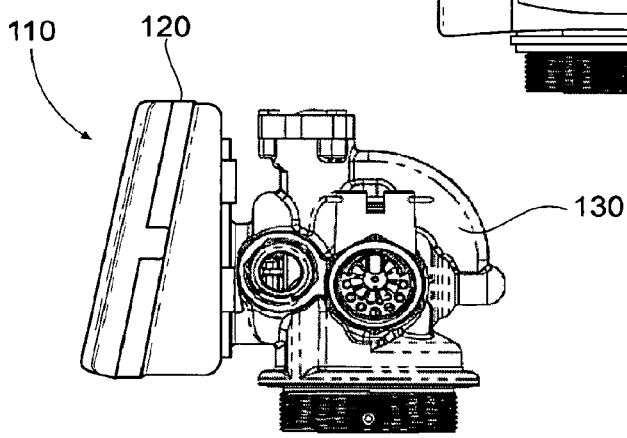
Figure 7:
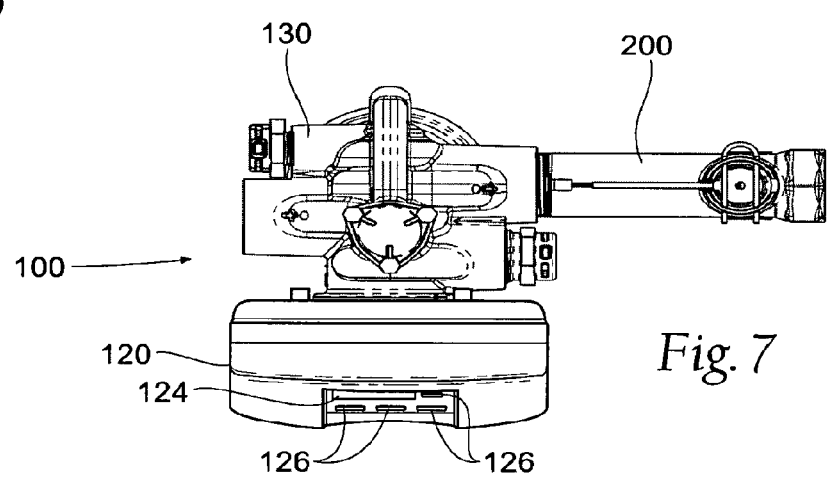
Figure 8A:
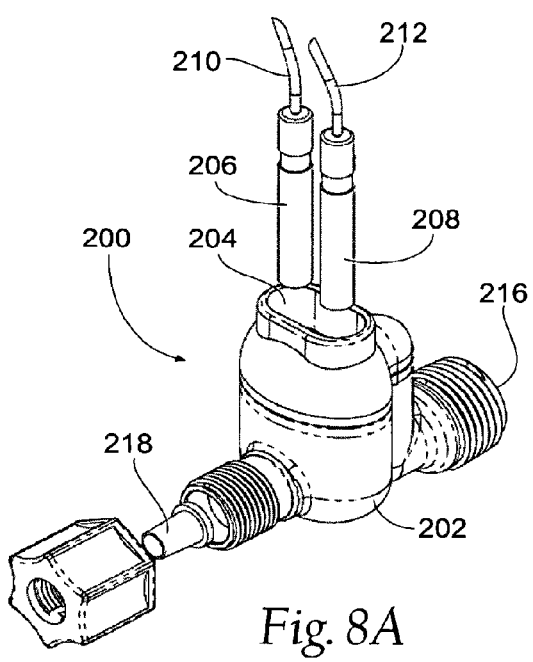
FIG. 8A shows a perspective view of a chlorinating device used in accordance with the present invention.
Figure 8B:
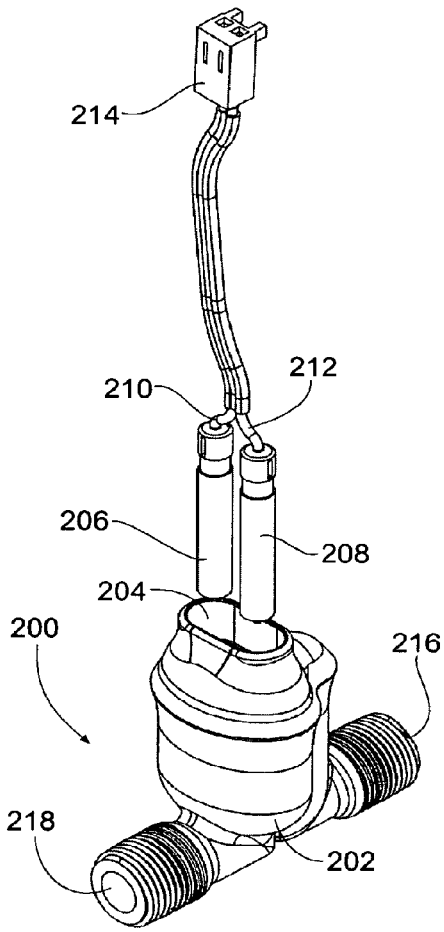
FIG. 8B shows the chlorinating device of FIG. 8A having an alternated wiring arrangement.
Figure 9:
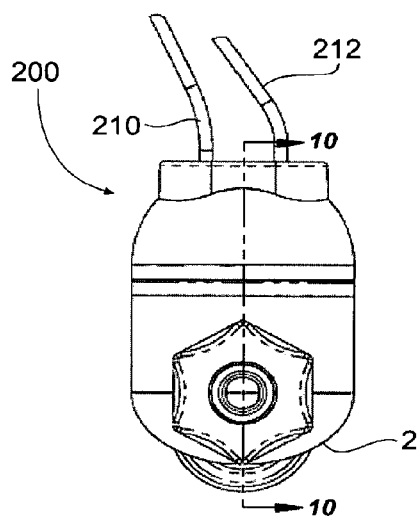
FIG. 9 is a front elevated view of the device of FIG. 8A.
Figure 10:
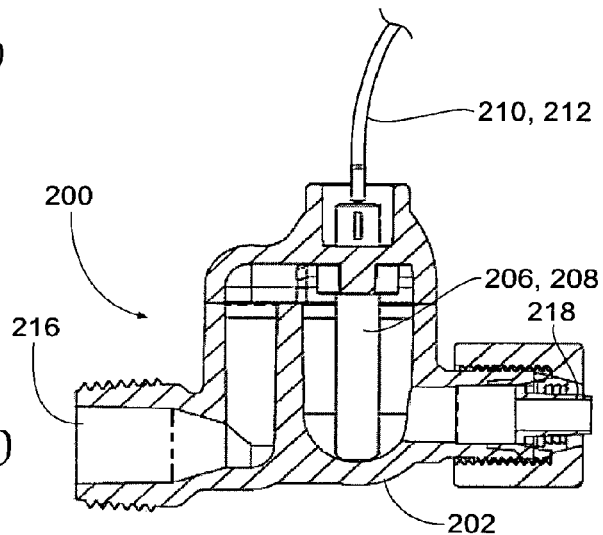
FIG. 10 is a cross-sectional view of the device of FIG. 8A taken through the line 10-10 of FIG. 9.

While the present invention may be embodied and employed in any of several fluid treatment apparatuses, examples of apparatuses can be seen in the following drawings. FIGS. 2 and 3 show a water treatment system 10. The system has a programmable controller 20 and valve body 30 that are supported on a treatment reservoir 40. The controller 20 has an interface 22, which provides an area for a display screen output 24, which is capable of displaying the flow chart depicted in FIG. 1. The controller also has various buttons 26 that allow the cycles to be programmed for the system 10. Exemplary individual cycles are depicted passing through the multiple configurations of the valve body 30 in FIGS. 16-21.

The valve body 30 is best shown in FIGS. 2 and 3. Valve body 30 includes inlets and outlets to connect the system 10 to a water or fluid source, a chemical source and the treatment reservoir, as well as the treated fluid system being fed by the system 10. The valve body 30 is depicted as exemplary of any of several valve body configurations that are known and used in the art and should not be considered limiting to the present invention. The valve body 30 may be modified depending on the specific needs for an individual treatment system.

FIGS. 4-7 show another embodiment 110 of an apparatus potentially incorporating the present invention. The apparatus 110 is similar to the apparatus 10, except the design of a controller 120 and a valve body 130 have been altered slightly. However, the apparatus 110 would incorporate the present invention as described previously for apparatus 10 and, also, would similarly interact with the various devices as is understood in the art, including output display screen 124 and input buttons 126. As stated with the valve body 30, the valve body 130 is merely exemplary of a possible valve body that is known and understood in the industry for use in water or fluid treatment system.

FIGS. 8A-10 show an exemplary ion exchange device 200 used in connection with the present invention and specifically with the embodiment 100 shown in FIGS. 4 through 7. The ion exchange device 200 could be replaced with any known device currently used in the industry. The depicted device 200 is used to regenerate chlorine in a treatment system. The device 200 generally comprises a housing 202 having an internal cavity 204. The cavity 204 has a first outlet 216, which is connected to a fluid port 220 on the valve body (see FIG. 3). A fluid inlet 218 allows for fluid to flow through the cavity 204 and is preferably arranged to be in fluid communication with a brine solution located in a separate brine tank (not shown).

Still referring to FIGS. 8A-10, the cavity 204 is arranged to house pair of electrodes 206, 208, which provide an electrical current to regulate and monitor the concentration of the solution or brine within the reservoir 40. The electrodes 206, 208 are connected to wires 210, 212, which are in electrical communication with the system 10. The wires 210, 212 can be connected to the system 10 in a variety of ways. As an example, an electrical connector 214 shown in FIG. 8B provides a possible electrical arrangement for the device 200. The electrodes 206, 208 can alternatively be used to monitor predetermined parameters of the system, and be used to trigger or commence one or more alternate regeneration cycles. For example, if the percentage of chlorine within the solution of the reservoir 40 falls below a desired amount, such as a concentration containing less than 25% brine, the system could be programmed so that the second or alternate regeneration cycle is commenced. Measuring the amount of chlorine could also be used as a back-up or alternate trigger for commencing the second regeneration cycle.

Alternatively, the electrodes 206, 208 could be used to signal a warning or override for the system 10 instead of triggering the second regeneration cycle. That is, if the concentration fell outside of desired ranges, the device 200 would send a signal that maintenance or service was needed for the system. The device 200 could also be used to monitor other characteristics or qualities of the solution or brine in the reservoir 40. Such examples could include monitoring the level of chlorine concentration in the system when a regeneration cycle starts and stops, or the time it takes the solution to run through the system or drain from the system. All of this information is archived in the controller 20 and can be recalled by a service technician.

Figure 11A:
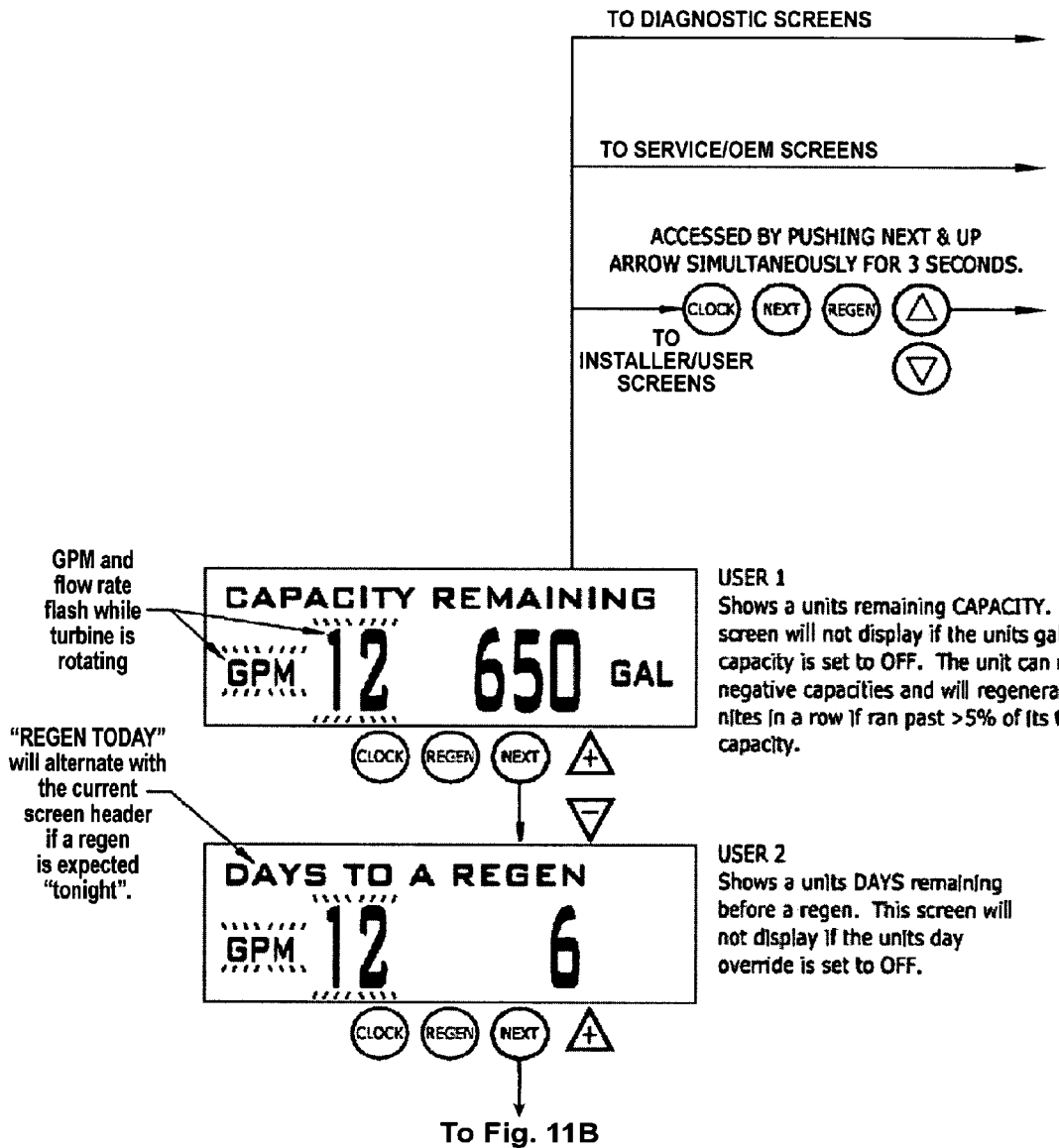
FIGS. 11A-15C provide various flow charts depicting various stages and cycles used in connection with the present invention and in connection with the flow chart depicted in FIGS. 1A and FIG. 1B.
Figure 11B:
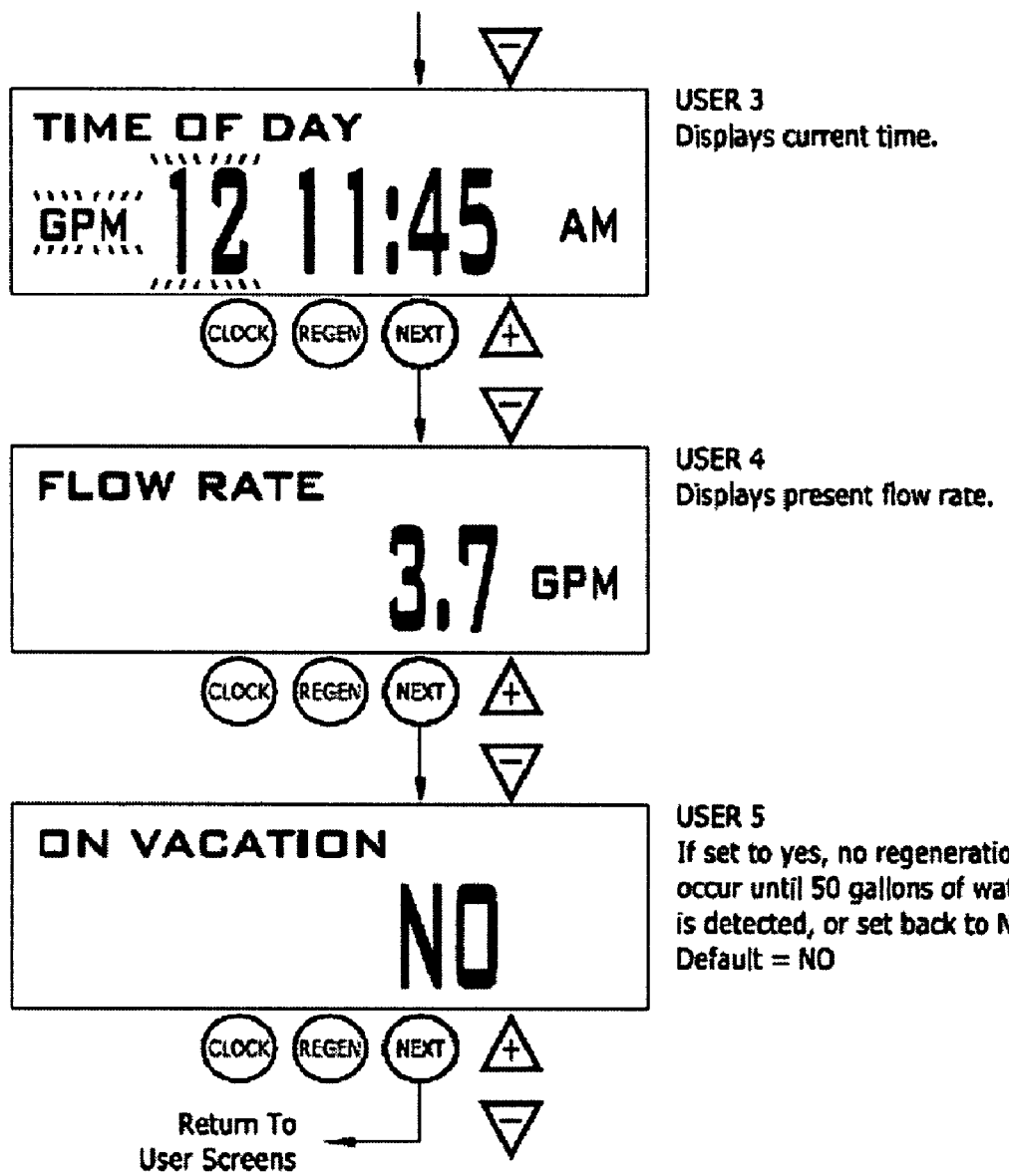

To further explain the invention and to show how it is incorporated into a water treatment device, FIGS. 11A through 15C depict flow charts incorporating various setup functions used in connection with the present invention. FIG. 11A and FIG. 11B depict various functions that are shown on the display screen 24 during normal operation of the regeneration device. The normal operation screen variables shown include: capacity of the system, days until a regeneration cycle will occur, flow rates including the current flow rate and the flow rate during regeneration, and time of the day. The normal operation screens also may show default and safety features, such as postponing any regeneration until a predetermined minimum amount of fluid has flown through the system.

Figure 12A:
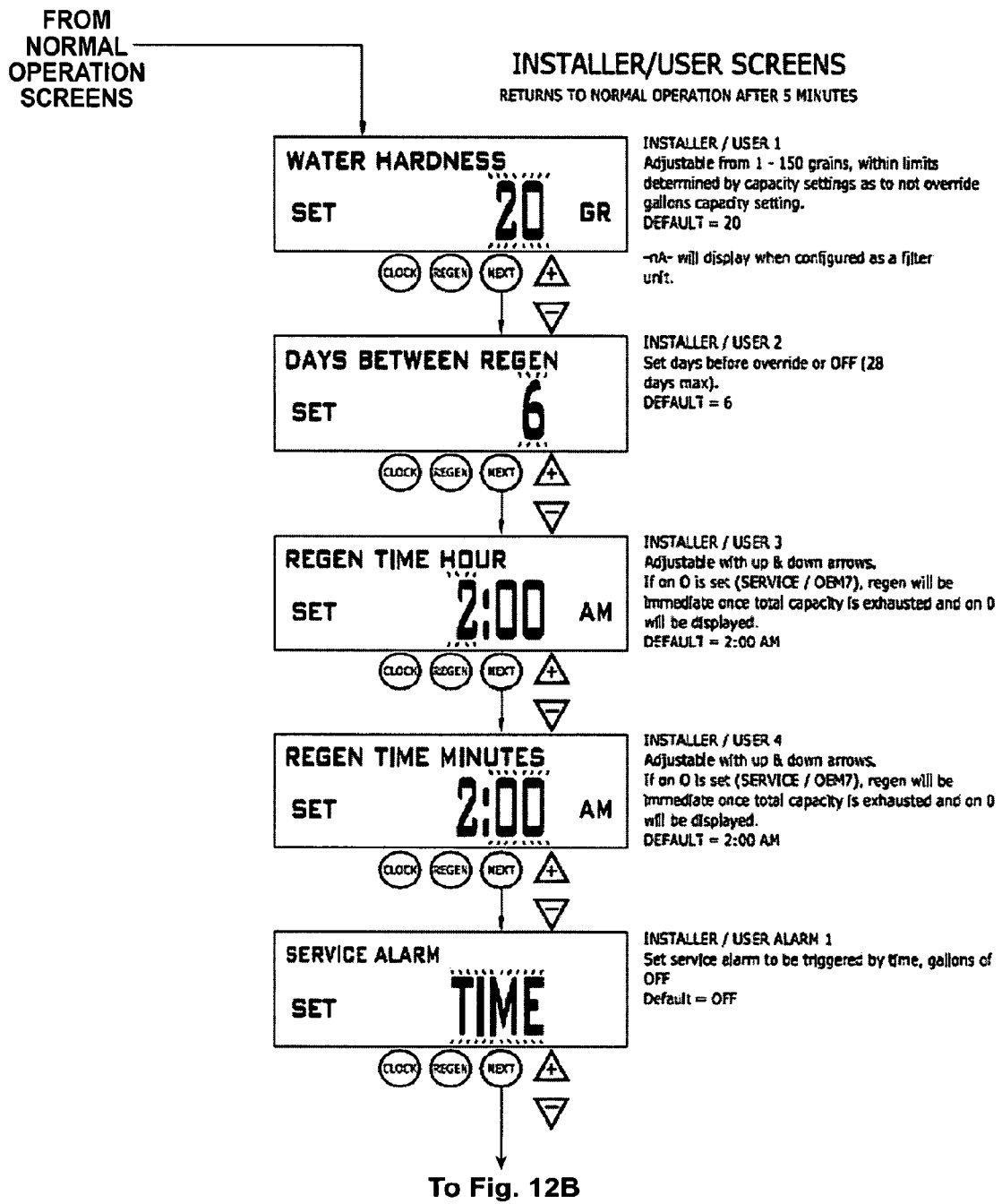
Figure 12B:
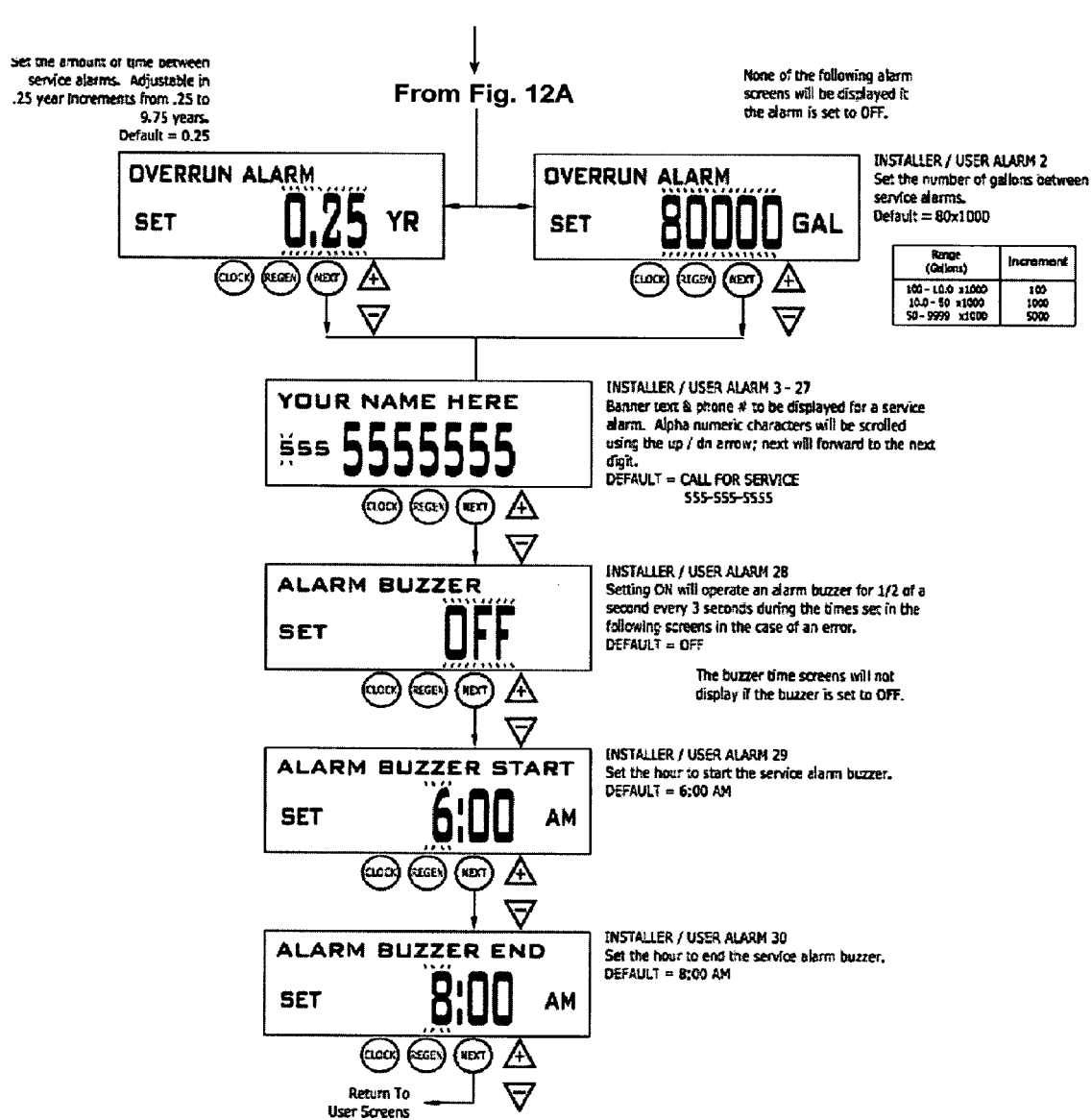

FIG. 12A and FIG. 12B depict a flow chart for an operator to monitor and adjust the parameters of the system when a regeneration cycle is being run as a water softening cycle. The system also allows for alarms to be activated when service should be performed on the system, with the ability to direct the service to a specific operator or installer of the system, possibly the individual who originally setup the system.

Figure 13:
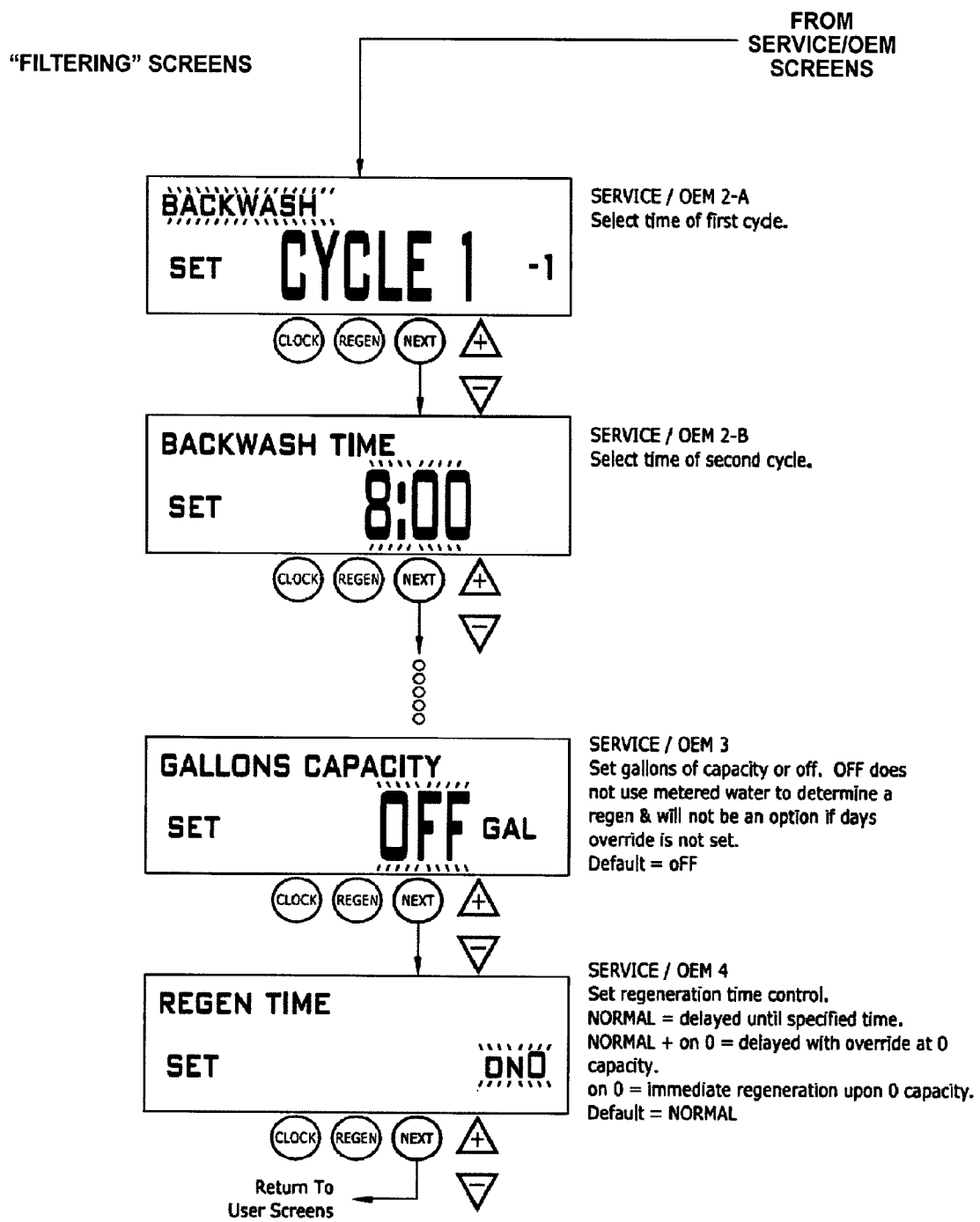

FIG. 13 shows a flowchart for a filtering cycle for the present invention. The flowchart in FIG. 13 will be accessed from the flowchart shown in FIG. 1, if a filtering cycle is chosen for either of the two regeneration cycles discussed previously. The filtering cycle can be set to operate for a predetermined time or for a predetermined volume or capacity of the system.

Figure 14A:
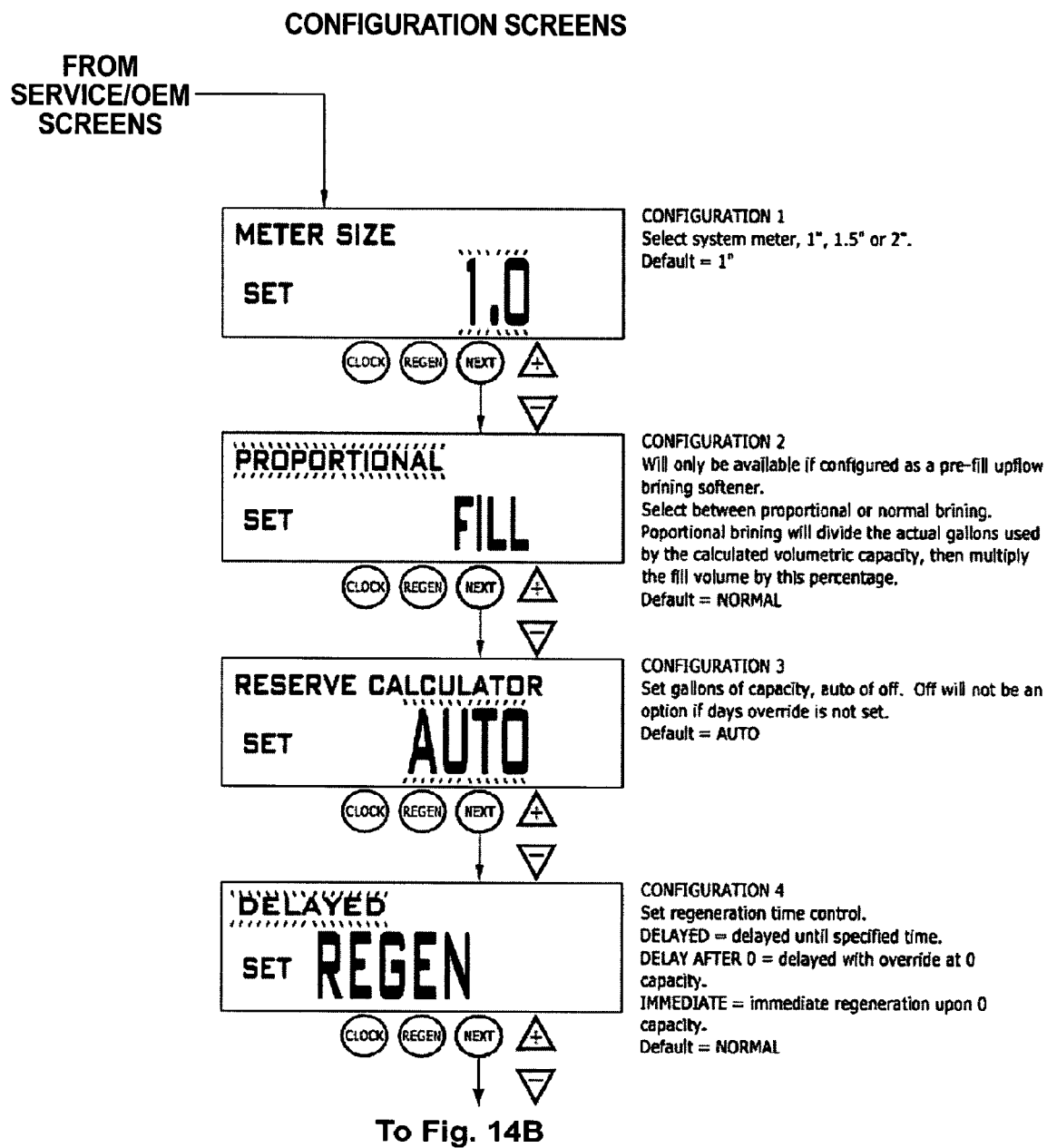
Figure 14C:
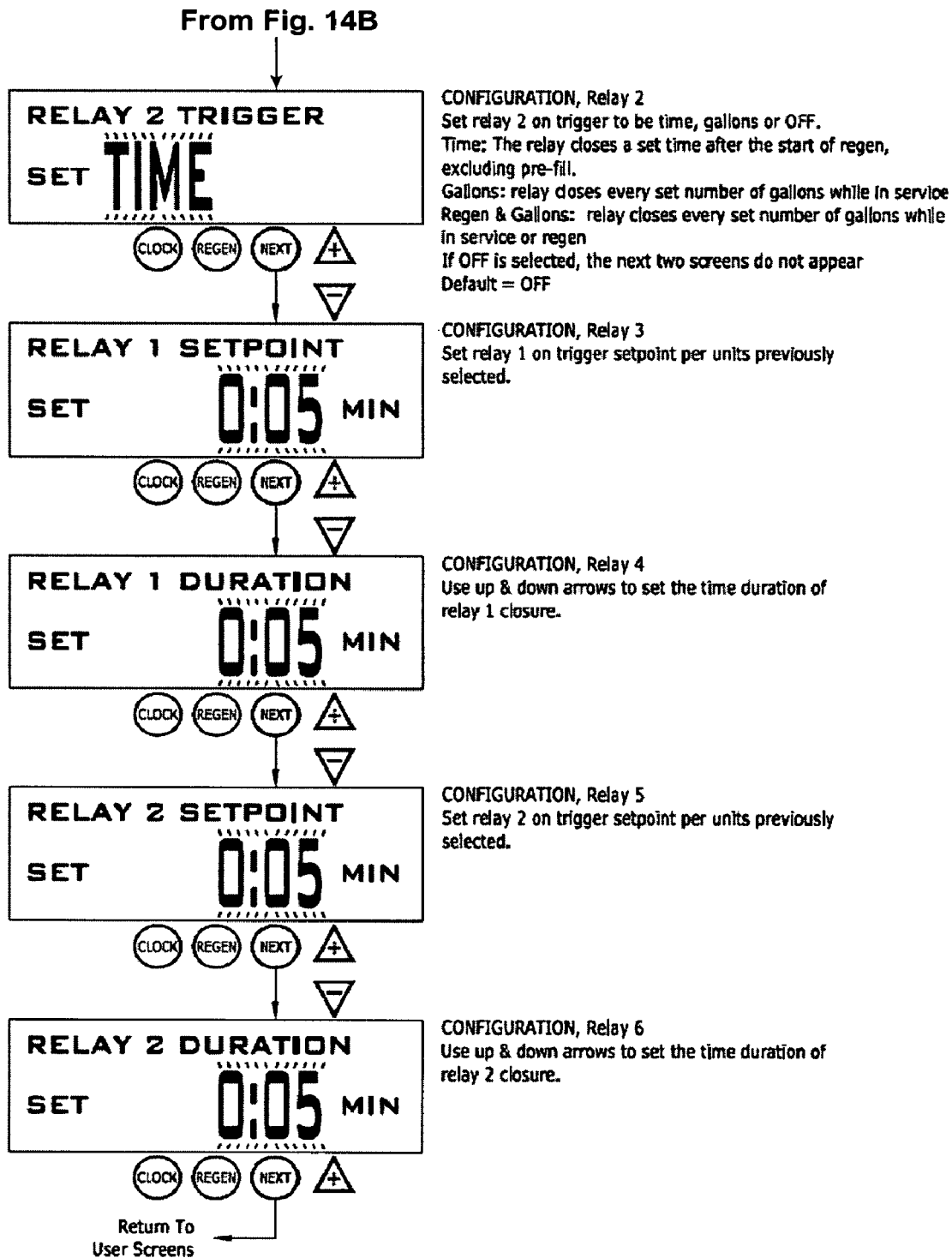

FIGS. 14A-14C provide a flowchart for setting up the parameters for a chlorine regenerator used in the present invention, such as that shown in FIGS. 8A-10, above. As depicted in the flowchart, the operator can determine the percentage of chlorine that should be regenerated for a specific cycle, the length of a specific cycle, and specific time for an individual stage of the chlorine generation and parameters for which the system will operate, such as chlorine concentration of the system.

Figure 15A:
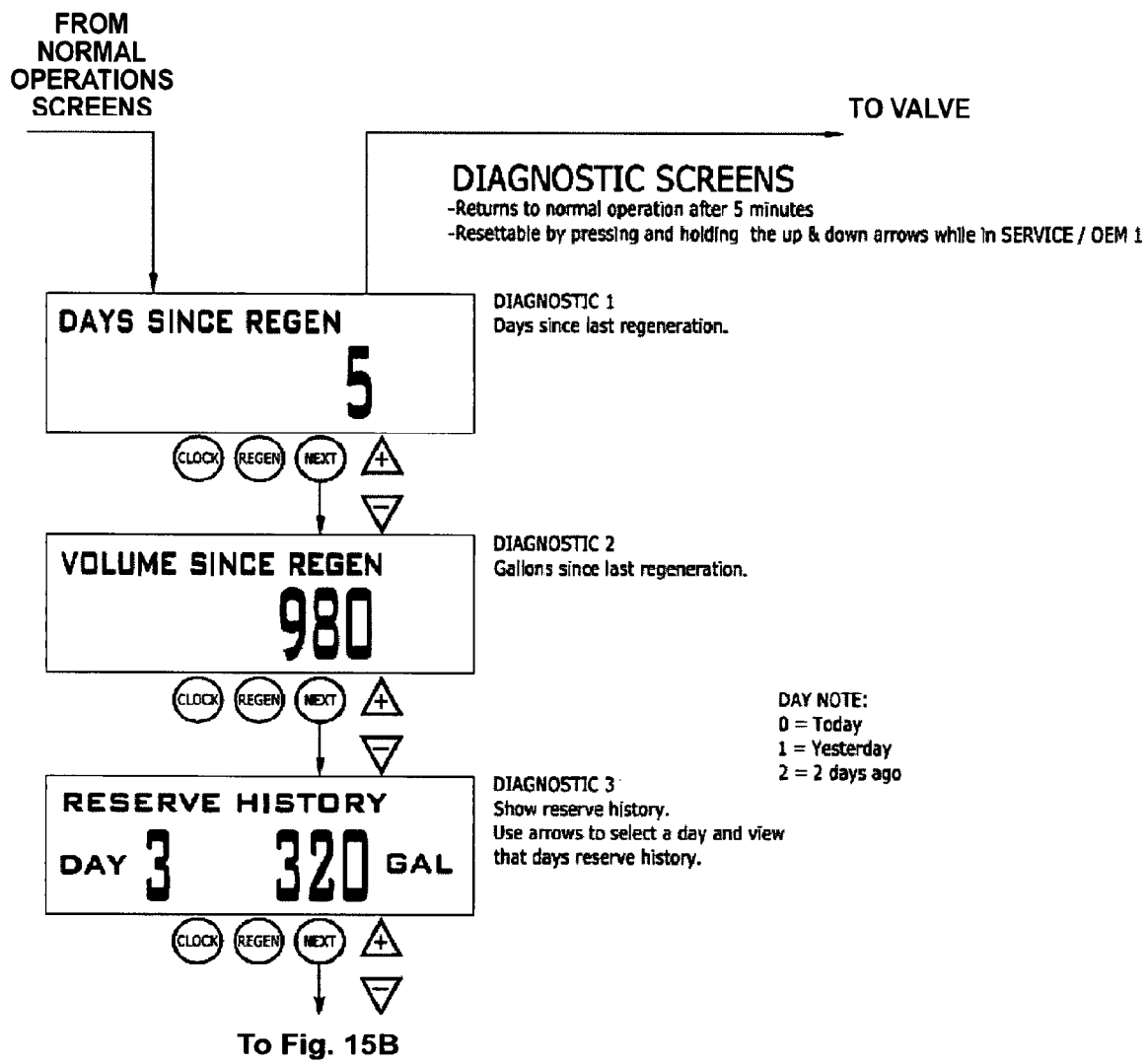
Figure 15B:
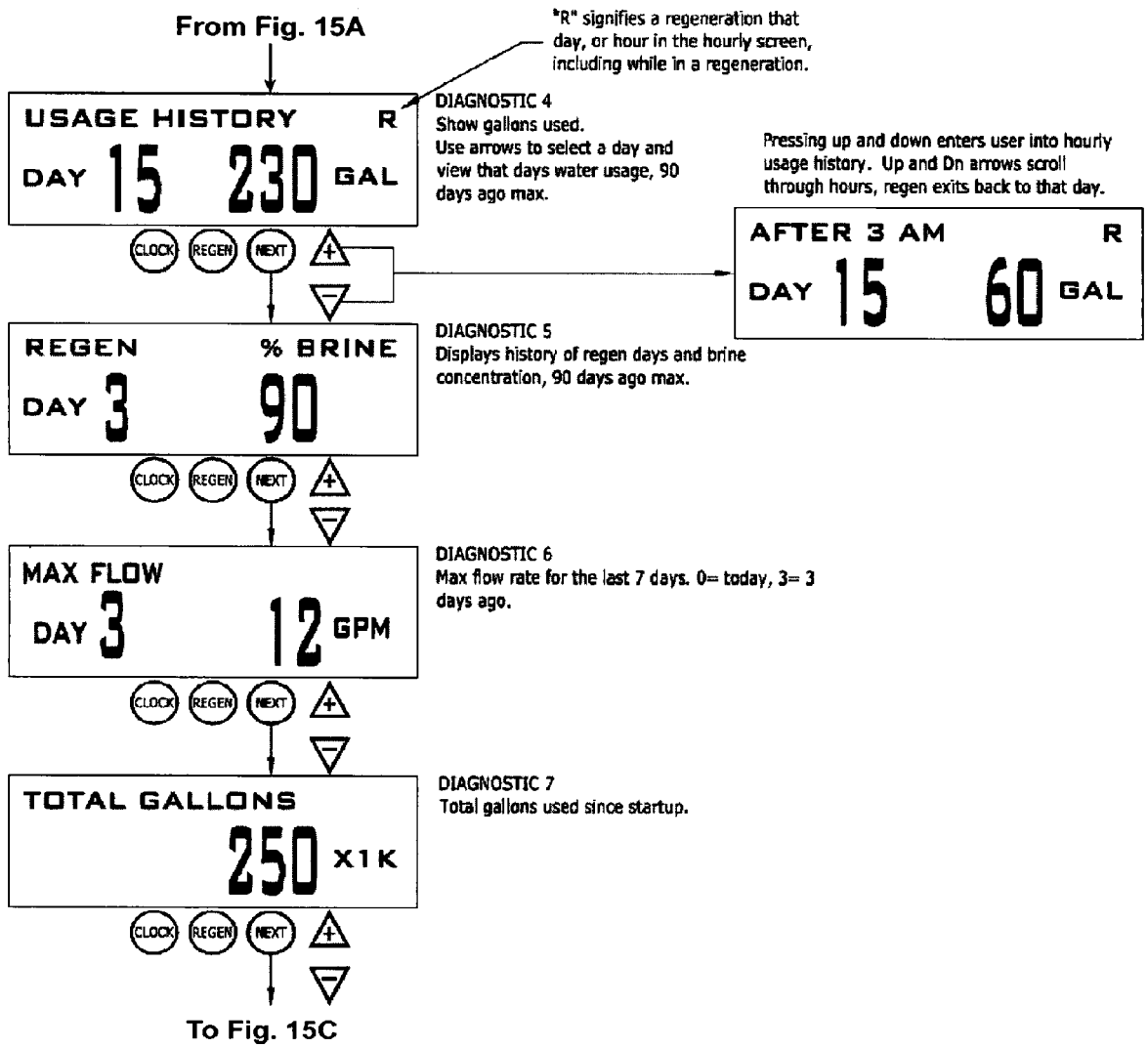
Figure 15C:
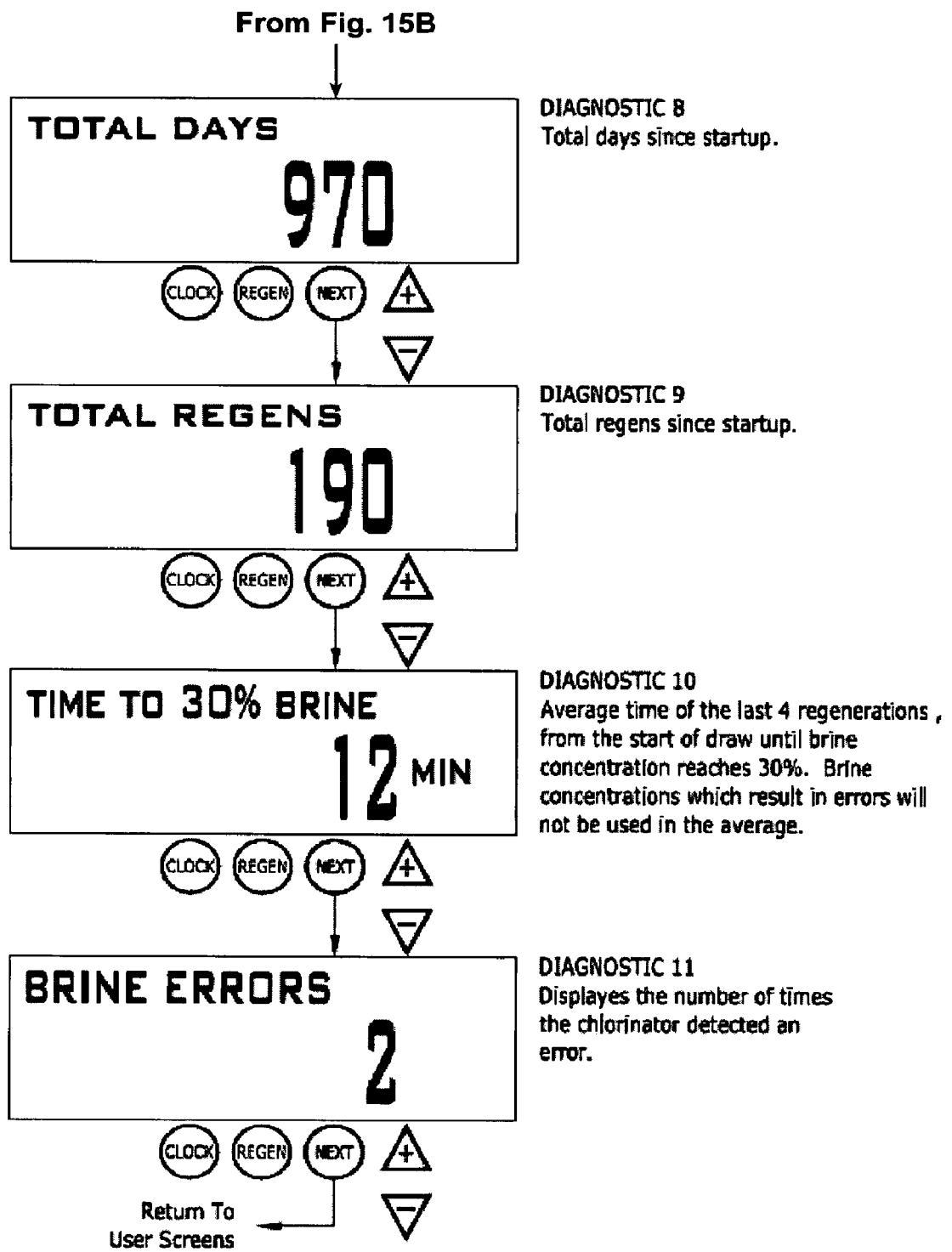
Figure 20:
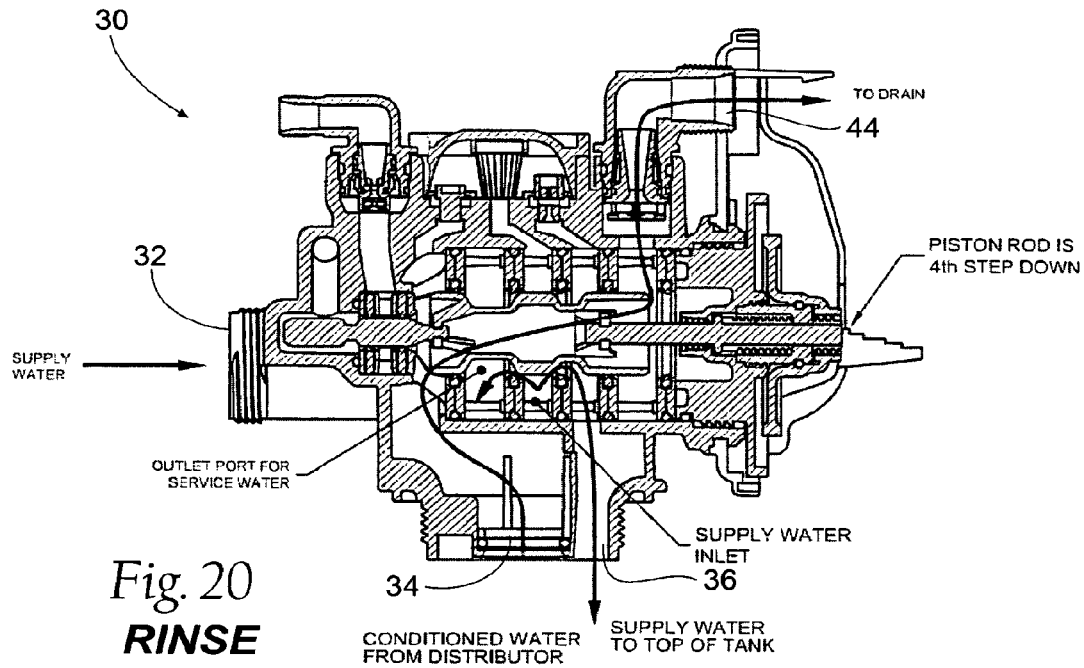
Figure 21:
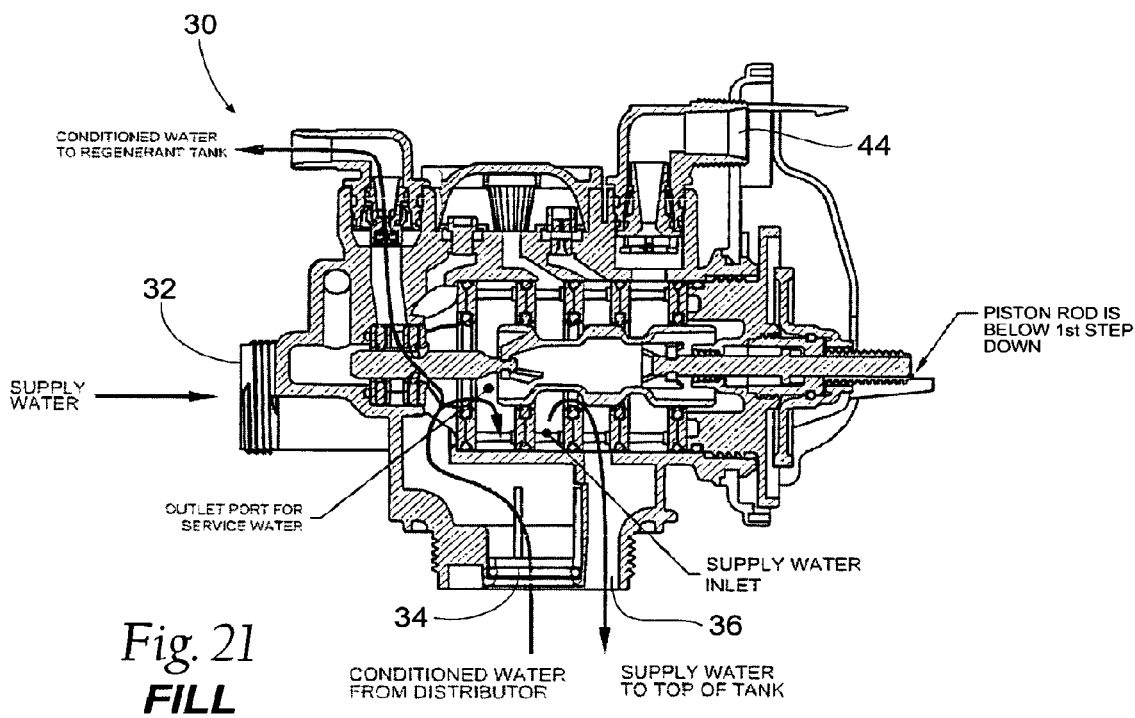

FIGS. 15A-15C provide a flowchart depicting various data screens that an operator can use to perform diagnostic functions on the system. For instance, the volume that has flown through the system since the last regeneration performed, the total amount of time the system has been in operation, or the total volume that has flown through the system since the system has been in operation. Such data may be useful in determining whether the system is operating properly or not. The system also has the ability to detect the number of errors that may arise during running of the system, which can be further used by the service technician in assessing reoccurring and/or isolated problems in the system.

As previously noted, FIGS. 16-21 depict cross-sectional views of the valve body 30 performing various stages that may be carried out within each of the regeneration cycles. The terms used to describe the various stages, Service (FIG. 16), Backwash (FIG. 17), Downflow Brine (FIG. 18), Upflow Brine (FIG. 19), Rinse (FIG. 20), and Brine Tank Fill (FIG. 21), are common terms used by those having ordinary skill in the art of water treatment and, specifically, water treatment for home and non-industrial water treatment systems. The valve 30 has a fluid inlet 32, which allows untreated water into the valve body 30 and a fluid outlet 42 for treated water, which is shown in FIG. 3. Inlet/outlet 34 is connected to the reservoir 40 (through a draw tube or pipe not shown) and allows solution to be brought into the valve body 30 and circulated through the valve body 30. An inlet 36 is also connected to the reservoir 40 and allows fluid to flow from the valve body 30, depending on which specific cycle is being performed at a given time. A drain 44 is used for various cycles to purge used or spent fluid from the system. The arrows in the various Figures indicate which of these inlets/outlets will be used for each of the various cycles.

The figures and description merely exemplify the many different arrangements that may be incorporated into the present invention. Provided that at least two distinct regeneration cycles may be accomplished and programmed within a single system, the system would fall within the present invention, regardless of the number of individual cycles in each of the regeneration cycles. In addition, the system may include a plurality of regeneration cycles. The system is designed specifically for use in residential settings. Each of the cycles can have any desired number of steps that will effectively treat the solution in the system and it may also be possible to incorporate other cycles if necessary. As stated, the system can be used to monitor various parameters of the system, such as volume passing through the system, the number of individual regeneration cycles run through the system, the concentration within the system, and the time the system has been active or inactive. The system could be programmed so that a cycle will be activated after a certain amount of water has run through the system, or possibly when the system becomes active after a period of non-use, such as when someone would be retuning from a vacation.

The system could also have one or more secondary triggers for commencing the alternate or secondary regeneration cycle. For instance, the system may be programmed to start the second regeneration cycle after a specific volume, i.e. 5000 gallons, has run through the system according to the first regeneration cycle. However, the system may be programmed so that the second regeneration cycle will commence after a period of time has passed, i.e. 3 months. The system could then reset to run according to the first regeneration cycle.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

We claim:

1. A method for treating water, said method comprising:
providing a water treatment device;
programming said device for a first regeneration cycle, said first regeneration cycle having at least one stage selected from the group consisting of: backwash, down brine, up brine, softening, rinse, service, and brine tank fill;
programming a duration for said first cycle, wherein said duration for said first regeneration cycle is measured as a number of said first regeneration cycles run;
programming said device for a second regeneration cycle, said second regeneration cycle being independent of said first regeneration cycle, said second regeneration cycle having at least one stage selected from the group consisting of: backwash, down brine, up brine, softening, rinse, service, and brine tank fill; and
monitoring at least one characteristic of the water within the water treatment device.

2. The method according to claim 1 where said duration for said first regeneration cycle is measured as a time period.

3. A method of conditioning a residential water source, said method comprising the steps of:
providing a water treatment device;
programming said device for a first regeneration cycle, said first regeneration cycle having at least one stage selected from the group consisting of: backwash, down brine, up brine, softening, rinse, service, and brine tank fill;
programming a duration for said first cycle;
programming said device for a second regeneration cycle, said second regeneration cycle being independent of said first regeneration cycle, said second regeneration cycle having at least one stage selected from the group consisting of: backwash, down brine, up brine, softening, rinse, service, and brine tank fill; and
programming a duration for said second regeneration cycle.

4. The method according to claim 3 wherein said water treatment device is connected to a tank containing a brine solution, said method further comprising the step of monitoring the time for the treatment device to process the brine within said tank.

5. The method according to claim 3 further comprising the step of providing means for commencing said second regeneration cycle.

6. The method according to claim 5 wherein said means for commencing is selected from the group consisting of: monitoring the water level in the device, monitoring the percentage of brine within the device, monitoring the percentage of chlorine within the device, monitoring the number of said first regeneration cycles run, monitoring the volume of water passed through the device, or monitoring the time the device has run.

7. The method according to claim 3 wherein at least one of said durations is measured as a number of said first regeneration cycles run.

8. The method according to claim 3 wherein at least one of said durations is measured as a volume.

9. The method according to claim 3 wherein at least one of said durations is measured as a time period.

10. The method according to claim 3 further including the step of monitoring at least one characteristic of the water within the water treatment device.

* * * * *